United States Patent
Bullis

(10) Patent No.: US 7,338,061 B2
(45) Date of Patent: Mar. 4, 2008

(54) STABILIZED VEHICLE USING ARTICULATING JOINT

(76) Inventor: James K. Bullis, 1155 Pimento Ave., Sunnyvale, CA (US) 94087

(*) Notice: Subject to any disclaimer, the term of this patent is extended or adjusted under 35 U.S.C. 154(b) by 378 days.

(21) Appl. No.: 11/064,301

(22) Filed: Feb. 23, 2005

(65) Prior Publication Data

US 2006/0185912 A1   Aug. 24, 2006

(51) Int. Cl.
   *B62D 12/00*   (2006.01)
(52) U.S. Cl. .............. 280/419; 280/411.1; 280/418; 280/426; 180/19.1; 180/19.2; 180/19.3; 180/12; 180/253; 180/6.48
(58) Field of Classification Search .......... 280/418, 280/419, 426, 411.1; 180/19.1–19.3, 12, 180/253, 6.48
   See application file for complete search history.

(56) References Cited

U.S. PATENT DOCUMENTS

| | | | | |
|---|---|---|---|---|
| 3,887,095 A | * | 6/1975 | Suzuki | 414/680 |
| 4,042,053 A | * | 8/1977 | Sieren et al. | 180/236 |
| 4,313,517 A | * | 2/1982 | Pivar | 180/216 |
| 5,579,863 A | * | 12/1996 | Nelson et al. | 180/418 |
| 6,827,164 B2 | * | 12/2004 | Palumbo et al. | 180/65.1 |

* cited by examiner

*Primary Examiner*—Lesley D. Morris
*Assistant Examiner*—Marlon Arce-Diaz

(57) ABSTRACT

The present invention provides a critical breakthrough in wheeled vehicle concepts, by enabling stable vehicle operations, where wheelbase configuration varies in relation to the need for roll preventing force. This enables a new form of automobile that is especially suited for electric adaptation.

The invention is an articulated vehicle that includes a stabilizer part and a carriage part where the two parts are linked by a two axis joint that locks the parts together in regard to relative roll motion, but allows pitch attitude and yaw attitude of each part to be mutually independent. Such a joint allows wheels to maintain firm contact with road surfaces while liking to cause the carriage to follow the stabilizer, and enables roll stabiliztion effects. In a turn condition, the stabilizer extends a wheel toward the outside of the turn such that upward force on that wheel counters roll torque that occurs due to radial acceleration due to the turning radius and speed of the vehicle.

24 Claims, 12 Drawing Sheets

STABILIZED VEHICLE USING ARTICULATING JOINT

This patent document contains material that is subject to copyright protection. Facsimile reproduction is allowed of the patent document or the patent disclosure as it appears in the Patent and Trademark Office patent file or records as allowed by US patent law, but otherwise all copyright rights are reserved.

BACKGROUND OF THE INVENTION

1. Field of the Invention

This present invention relates to wheeled, transportation vehicles that operate on roadways or off road surfaces. The field spans from automobiles to trucks to farm tractors to construction vehicles to bicycles.

2. Description of the Prior Art

Essential traits of transportation devices include safety, comfort, convenience, and efficiency in the context of the way people's homes, work places, and other destinations are distributed Additionally, a successful product must not neglect the need to be appealing to prospective buyers. Automobile design has met such a list of requirements so well that cars have long been the prevailing choice of the public. Clearly there are many safety problems. Convenience is deteriorating with crowded roads and parking space. Efficiency is a problem of more or less severity depending on availability of fuel, and well known oil resource limitations indicate a future that looks difficult for the present automobile concept.

Electric vehicles have some promise. Domestic coal supplies are much more adequate than oil, so the use of this fuel in electric power generation is a practice that can continue for many years, even with expanded loads that result where the electric power is used to charge batteries that run electric vehicles. Simple adaptation of the present automobile designs to electric power is not a very satisfactory solution since the electric systems are limited in energy capacity. A more complete solution involves a completely new vehicle concept, where greater efficiency serves to enhance driving distance for a set of charged batteries. As far as possible, this complete solution should also improve safety and convenience.

A suggested answer to the problem comes from observation that over 95% of cars on the road have only one driver. Most car pool lanes are very lightly used, suggesting that drivers value their independence very highly. The most critical need is to alleviate the situation at commuting times where the percentage of single car riders is even higher. This leads to a search for a satisfactory single occupant vehicle. This does not have to be exactly a single rider, that is, a tandem rider arrangement would seem to offer some flexibility. If this can be half as wide as the conventional car, there are some very important advantages to be gained. Such advantages could include alleviating congestion and reduction in air drag. A design also needs to respond to driver discomfort with riding at a low level relative to other cars and trucks on the road, where poor visibility both is an irritation and a cause of hazardous situations. An electric vehicle design can go only part way toward this goal by judicious weight distribution, where very heavy batteries are placed to ride close to the ground.

In looking for alternatives one can examine other vehicle forms for ideas. Motorcycles and bicycles operate on very different dynamic principles. Farm tractors have utilized a tricycle configuration. Construction vehicles expand on steering possibilities. Forklift trucks have wheel base arrangements like automobiles running in reverse.

Large semi-trucks use tractor and trailer arrangements, where a hitch connects the two parts. The tractor is conceptually the same as the common automobile. The trailer is like a trailer pulled by an automobile. The arrangement appears to be worked out to distribute loads on the wheels. These hitches are two axis joints that allow tractor and trailer to turn independently and allow tractor and trailer to follow uneven surfaces. These are not configured to enhance roll stability of the rig since the two axis joint is arranged with the pitch axis fixed to the tractor and the yaw axis fixed to the trailer. When the tractor is turned at a right angle with respect to the trailer, the pitch axis of the joint is aligned with the roll axis of the trailer. Therefore, no roll stabilizing torque can be transferred from the tractor to the trailer. The mechanism operates to provide less roll stabilization as turning conditions cause a need for more stabilization. It appears that this design concept depends on the inherent stability of the heavy load and a need for only gradual turns at higher speeds.

Articulated vehicles have been developed for off road use. Those known appear to use the articulated arrangement to enable different parts of the vehicle to hold contact with irregular ground surfaces.

SUMMARY OF THE INVENTION

The present invention provides a critical breakthrough in wheeled vehicle concepts, by enabling stable vehicle operations, where wheelbase configuration varies in relation to the need for roll preventing force. This concept provides for additional stability of electric vehicles, such that aspect ratio, being the ratio of vehicle height to vehicle width, can be significantly increased. This increased aspect ratio enables significant reduction of vehicle width while maintaining, or even raising, the height of the driver. Thus, road and parking congestion can be reduced, air drag can be reduced to increase vehicle range at high speed, and driver comfort and safety can be maintained. Improved protective structure can also be a benefit of the vehicle stability since weight of such structure can be added without causing dangerous roll tendencies.

The invention is an articulated vehicle that includes a stabilizer part and a carriage part where the two parts are linked by a two axis joint that locks the parts together in regard to relative roll motion, but allows pitch attitude and yaw attitude of each part to be mutually independent. Such a joint allows wheels to maintain firm contact with road surfaces, causes linkage that causes the carriage to follow the stabilizer travel, like a trailer, and enables roll stabilization effects of the stabilizer to be conveyed to the carriage. In a turn condition, the stabilizer extends a wheel toward the outside of the turn such that upward force on that wheel counters roll torque that occurs due to radial acceleration due to the turning radius and speed of the vehicle. A yaw axis is a hinge that permits yaw of one part relative to the other. Similarly, a pitch axis is a hinge that permits pitch of one part relative to the other. The yaw axis is fixed on the stabilizer and the pitch axis is fixed on the carriage. An offset between the yaw axis and the pitch axis enables load distributions that prevent relative pitch effects that would otherwise negate the roll stabilization effect.

Steering of the vehicle is accomplished by action of the driver to turn the rear stabilizer wheels to cause them to pivot about a vertical axis. Forward motion of the vehicle results in the stabilizer turning such that the front stabilizer wheels turn. Turning of the front stabilizer wheels causes turning force to be applied to the carriage. Since the driver rides in the carriage, a steering linkage connects from his control lever, through the joint, to the rear stabilizer wheels. That control lever acts as a tiller to steer the overall vehicle, where its location in the carriage serves to make a remarkably stable steering system. By aligning this tiller with the intended path, a turn will be carried out by the mechanism without further driver action.

Drive force is applied through one or more wheels that can be either part of the stabilizer or part of the carriage, or both Turning stability and associated passenger comfort are further enhanced by a design with a tilted yaw axis relative to the true vertical, such that the stabilizer imparts a favorable roll to the carriage, rather than just holding it in a flat turn condition.

A capability to steer the rear vehicle wheel, or wheels, allows for operating adjustments that are needed to react to high side winds. This steering is also very desirable when parking, or generally backing, the vehicle.

Streamlining is necessary to completely develop this concept since that is necessary to minimize air drag on a fast moving vehicle.

DETAILED DESCRIPTION OF THE PREFERRED EMBODIMENTS

This invention enables a wide variety of vehicle types. This description focuses on a representative electric powered vehicle for single or tandem passenger transportation. Variations are discussed to make clear the scope of applicability. The described examples are coarsely implemented at this point, but the examples are sufficient to make it possible to readily adapt a vast existing knowledge base to refine on the concepts, where the applicable knowledge base exists in the automotive industry as well as all other wheeled vehicle industries. Comments are included in this description where it seems they might provide useful guidance.

Figure 1:
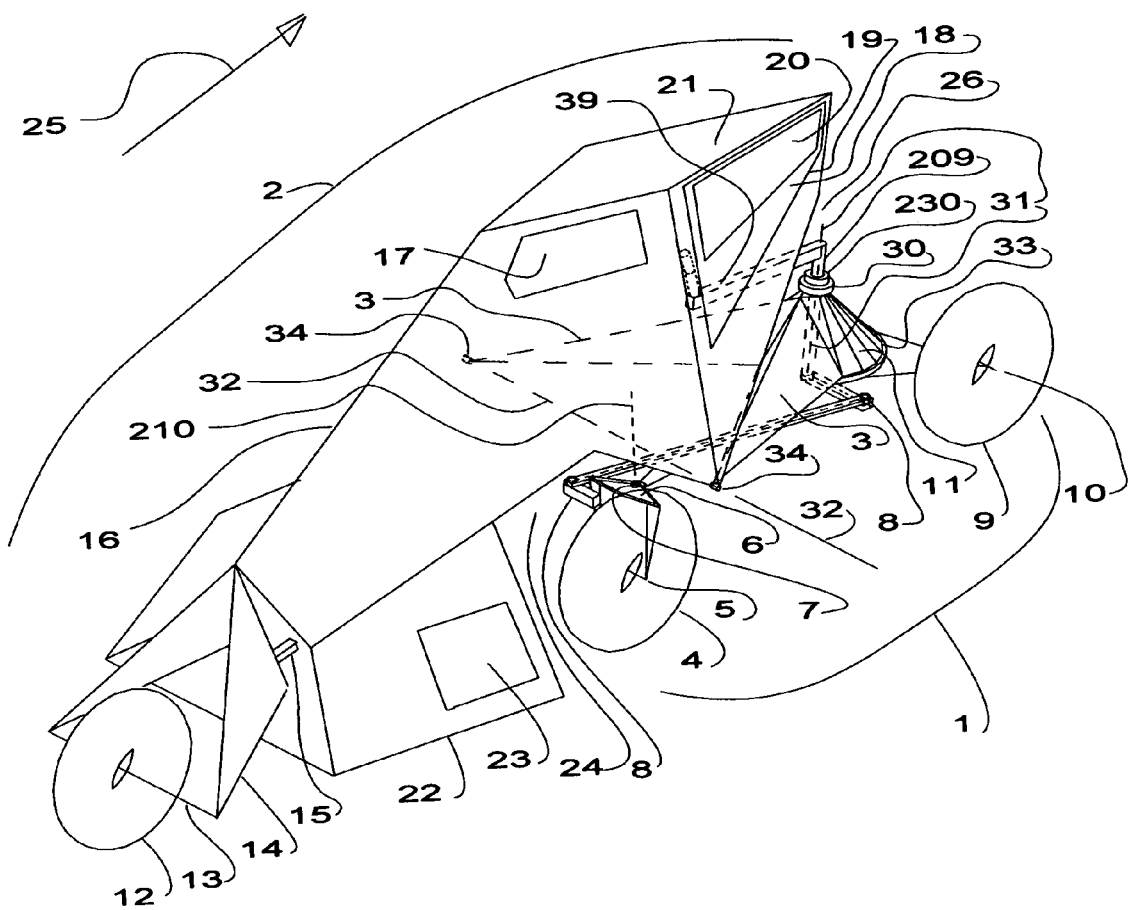
FIG. 1 shows an articulated vehicle concept in isometric view.

The example of FIG. 1 implements a moderately high aspect ratio vehicle, where aspect ratio is a term here used to describe the ratio of the height of the vehicle to the wheel base lateral width. The vehicle shown is constructed to have very high rigidity so as to maximize protection of the driver in a collision situation. The cabin structure causes significant mass at a greater height than might otherwise be the case, especially for a narrow wheel base. The stabilizing effect of the invention is then incorporated to make the overall system stable.

In FIG. 1 the forward direction is indicated by an arrow 25. The main vehicle parts are the stabilizer 1, carriage 2, and joint structure 3. Two axis articulation between the stabilizer 1 and the carriage 2 is enabled by the joint structure 3 and the yaw axis bearing arrangement 11,30,230, 33 that enables relative hinging about the yaw axis 31 and the pitch axis bearing arrangement 34 that enables hinging about the pitch axis 32. The joint structure 3 provides an offsetting effect, such that the pitch axis 32 is significantly rearward of the yaw axis 31. The joint structure 3 is shown with dashed lines indicating Parts of that joint structure that are hidden by the carriage 2 in this view. Detailed parts shown include a right control wheel 4 of two such control wheels 4, that are also called rear stabilizer wheels 4. Each of the control wheels 4 turns on an axle like the right side axle 5 mounted using support structure 6. The control wheels 4 pivot about respective vertical axes, as represented by a vertical axis 210 shown through a pivot point 7. A linkage 8 connects via a vertical shaft 209 that passes from beneath the stabilizer 1 through the yaw axis bearing arrangement 11,30,230,33 of the joint structure 3 to a tiller 39 that enables a driver to control the pivoting of control wheels 4. The linkage 8, the vertical shaft 209, and the tiller 39 are shown using dashed lines where these parts would be concealed by the carriage 2. A front stabilizer wheel 9 turns on its axle 10. A conical bearing arrangement 11,30,33,230 enables the stabilizer to turn about the near vertical yaw axis 31. In this conical bearing arrangement, an apex bearing 30 is structurally supported relative to a cone base bearing 33 by a hollow cylindrical part 230, such that the conical part 11 of the joint structure 3 is allowed to turn, or hinge, about the yaw axis. The pitch axis 32 enables the carriage wheel 12 to keep road surface contact. Pitch requires clearance 26 between the carriage and the bearing arrangement. A carriage access door 18 hinges on hinge line 19 and provides a windshield 20. A carriage top 21 provides both rain shedding and structural strength. A rear view window 17 is included as well. Carriage strongback 16 carries roll torque to heavy battery load accessible through side panel 23 in the battery compartment 22. Clearance 24 is provided for control wheels to pass under the carriage, in and out. Because the stabilizer 1 turns relative to the carriage 2 and the control wheels are extended back from the yaw axis a control wheel is significantly extended to the side of the articulated vehicle toward the outside of a turning circle. This provides stabilization to the vehicle in accordance with the sharpness of the turn.

The rear carriage wheel 12 turns on its axle 13 that is mounted on its support structure 14 that is turned by action of a linkage 15. Rear wheel turning capability allows for operating adjustments that are needed to react to high side winds. This steering is also very desirable when parking, or generally backing, the vehicle.

Figure 2:
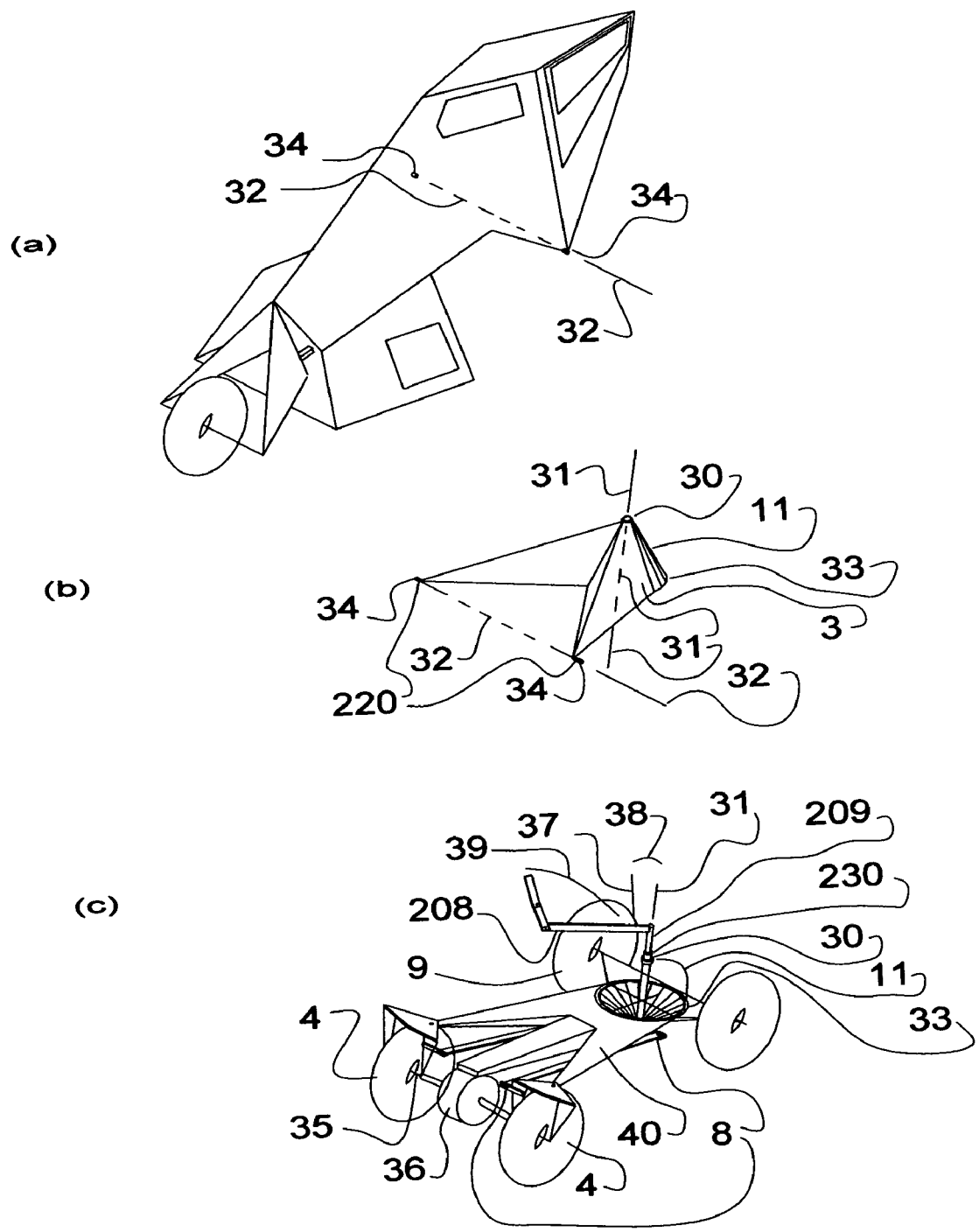
FIG. 2 shows separated carriage, joint structure, and stabilizer in isometric view

Hidden parts are made visible in FIG. 2. FIG. 2(a) shows the carriage relative to the pitch axis 32 about which the carriage hinges. FIG. 2(b) shows the same pitch axis 32 relative to bearing points 220, of bearing arrangement 34, mounted on the offsetting joint structure 3. The conical yaw bearing arrangement 11,30,33,230 includes an apex bearing 30 and a cone base bearing 33 to contain the conical part 11 of the offset joint structure 3 to allow hinging about the near vertical yaw axis 31. Apex bearing 30 is supported relative to cone base bearing 33 by a hollow cylindrical part 230. The offset between the pitch axis 32 and the near vertical yaw axis 31 is apparent in this view. It also is apparent that the structural linkage 3 and bearing arrangements 11,30, 33,230, 34 result in a high torque through the yaw bearing arrangement 11,30,33, 230. The offsetting joint structure 3 seems very suitable for this, where it is constructed in this example of tetrahedral forms that transfer loads well into the conical structure part. This offset axis arrangement is critical to this design concept and is a significantly novel part of this invention.

The main features of the stabilizer part are shown in FIG. 2(c). The lower cone that is fixed to the stabilizer also transfers load forces to the wheels through tetrahedral structures 40 which are shown to indicate the importance of strength in this design concept.

Also shown in FIG. 2(c) is the upper part of the steering linkage 39 that passes from within the carriage to a shaft 209 that passes through the center of the conical yaw bearing arrangement 11,30,33,230 so as to connect to the pivot control linkage 8 shown here and in FIG. 1. In an ultimately refined form, more precise details of turning geometry would be accounted for in the arranged linkage, where inner control wheel and outer control wheel would not be pivoted exactly the same. Also, such details as caster, camber, and toe-in would be addressed as is the case in conventional automobile design.

The intentional deviation 38 of actual yaw axis 31 angle relative to the true vertical 37 is also depicted here. This gives enhanced stability in a turn and associated passenger comfort. This design incorporates a tilted yaw axis relative to the true vertical, such that the stabilizer imparts a favorable roll to the carriage, rather than just holding it in a flat turn condition.

Further in FIG. 2(c), a single electric motor 36 is represented that is coupled with constant velocity joints 35 to the rear stabilizer wheels. This drive arrangement is probably the best since significant weight distribution needs to be on the control wheels for stability control purposes, and this same arrangements would tend to result in superior traction for the drive system. It is also feasible to use a simpler rear wheel drive system or a front wheel all wheel drive system. All wheel drive is certainly an option. The invention will work with an internal combustion, diesel or gasoline. A mechanical drive train can be used to any or all wheels. Diesel-electric hybrids are attractive as are gasoline-electric hybrids. Battery based operation with provision for intermittent charging as required is a well known method that is here applicable.

Figure 3:
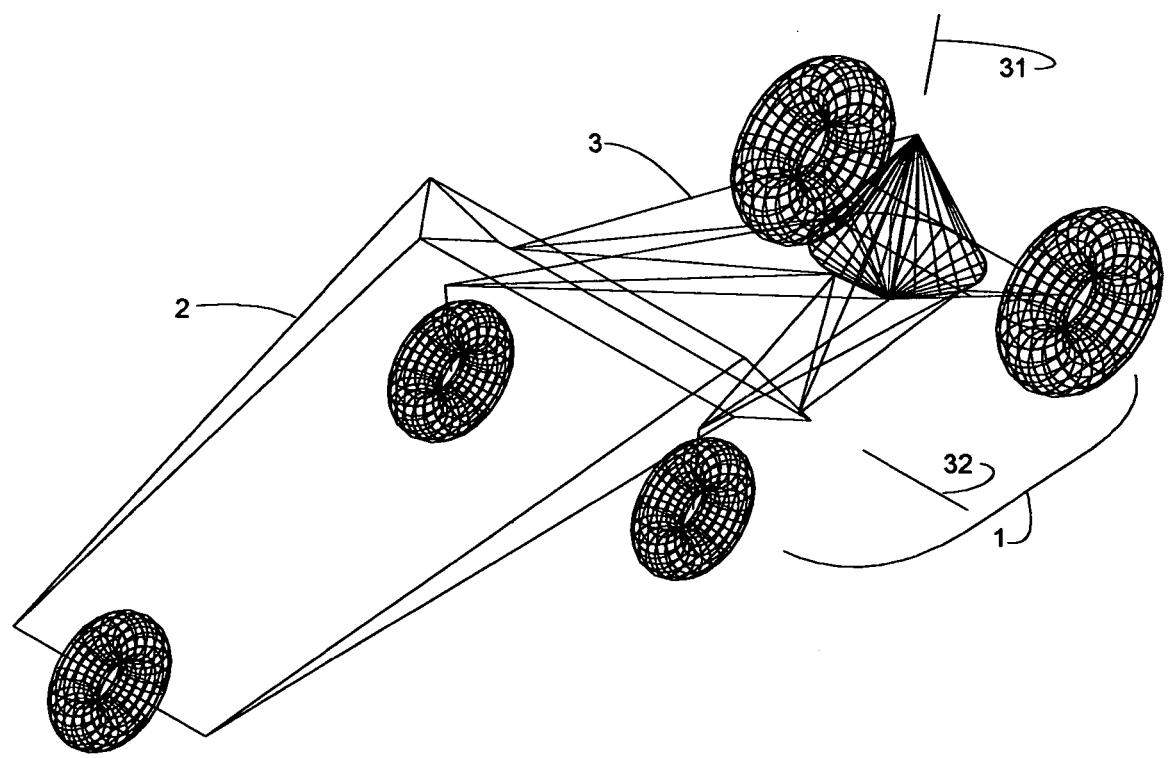
FIG. 3 is a wire frame depiction of a simplified vehicle that enables visualization of the main components, in isometric view.

FIG. 3 is a wire frame depiction of the key parts of the invention. Wheels are positioned corresponding with wheel positions of FIG. 1, and in this form, all wheels are visible. The carriage 2 is here represented in greatly simplified form. It is a rigid unit that is designed to prevent twisting within itself of any kind. Attachment of the carriage 2 to the joint structure 3 is now more visible, where hinging is enabled about the pitch axis 32. The joint structure 3 is formed by modified tetrahedrons, where one of the sides is adapted to conform to the conical surface that is used to structure the yaw bearing. These tetrahedrons are here represented by their edges, which are just lines on the drawing. The lower part of the yaw bearing is fixed on the stabilizer 1 where a conical surface is attached to four tetrahedrons that attach to the respective wheels. This figure is the basis for explanation of the operation of the invention.

Figure 4:
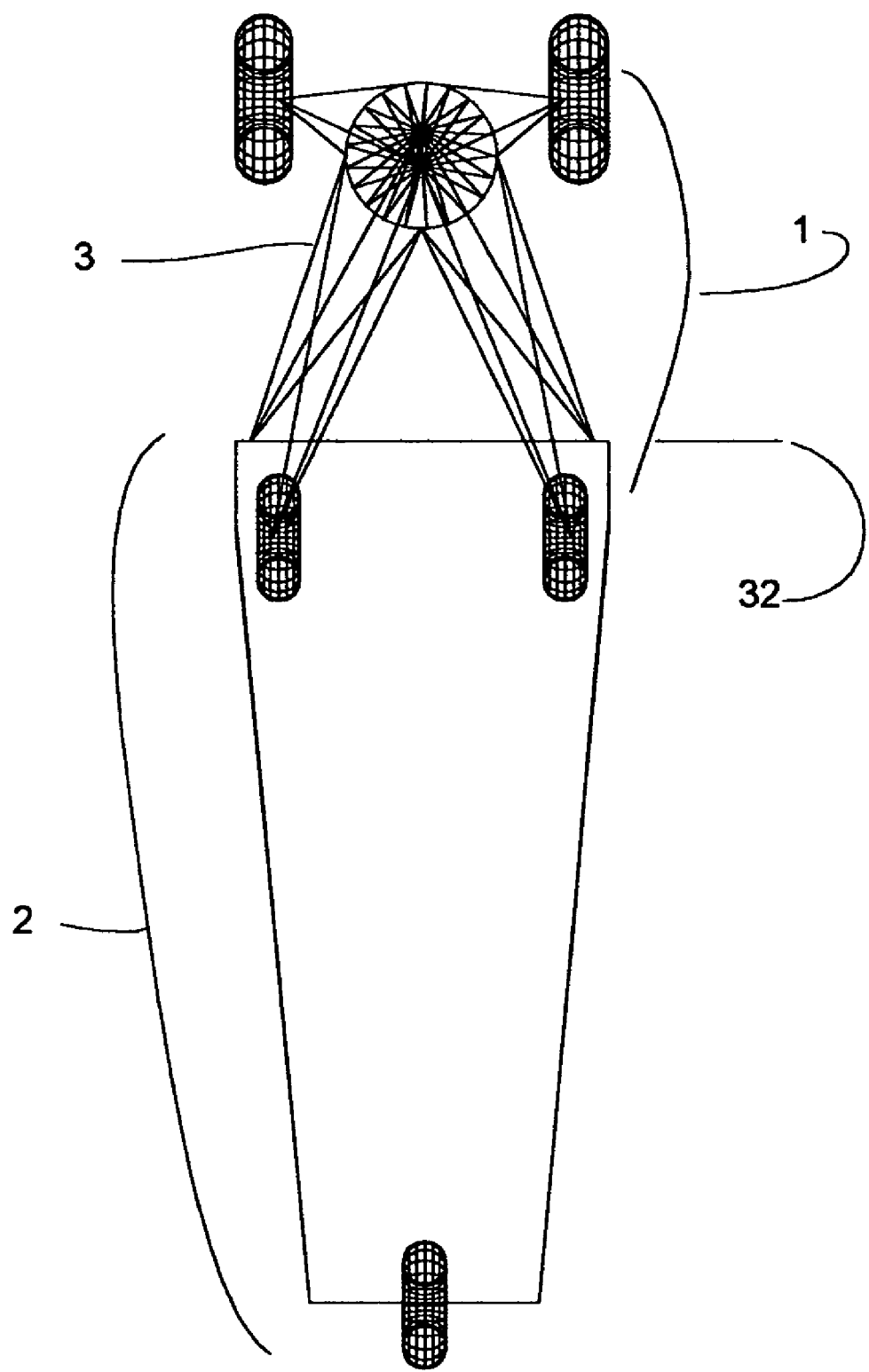
FIG. 4 is a plan view of the simplified vehicle showing wheel arrangement for straight line travel.

FIG. 4 is the same configuration as shown in FIG. 3, except it is a plan view. The rigid carriage 2 is further reduced to its outline only.

Figure 5:
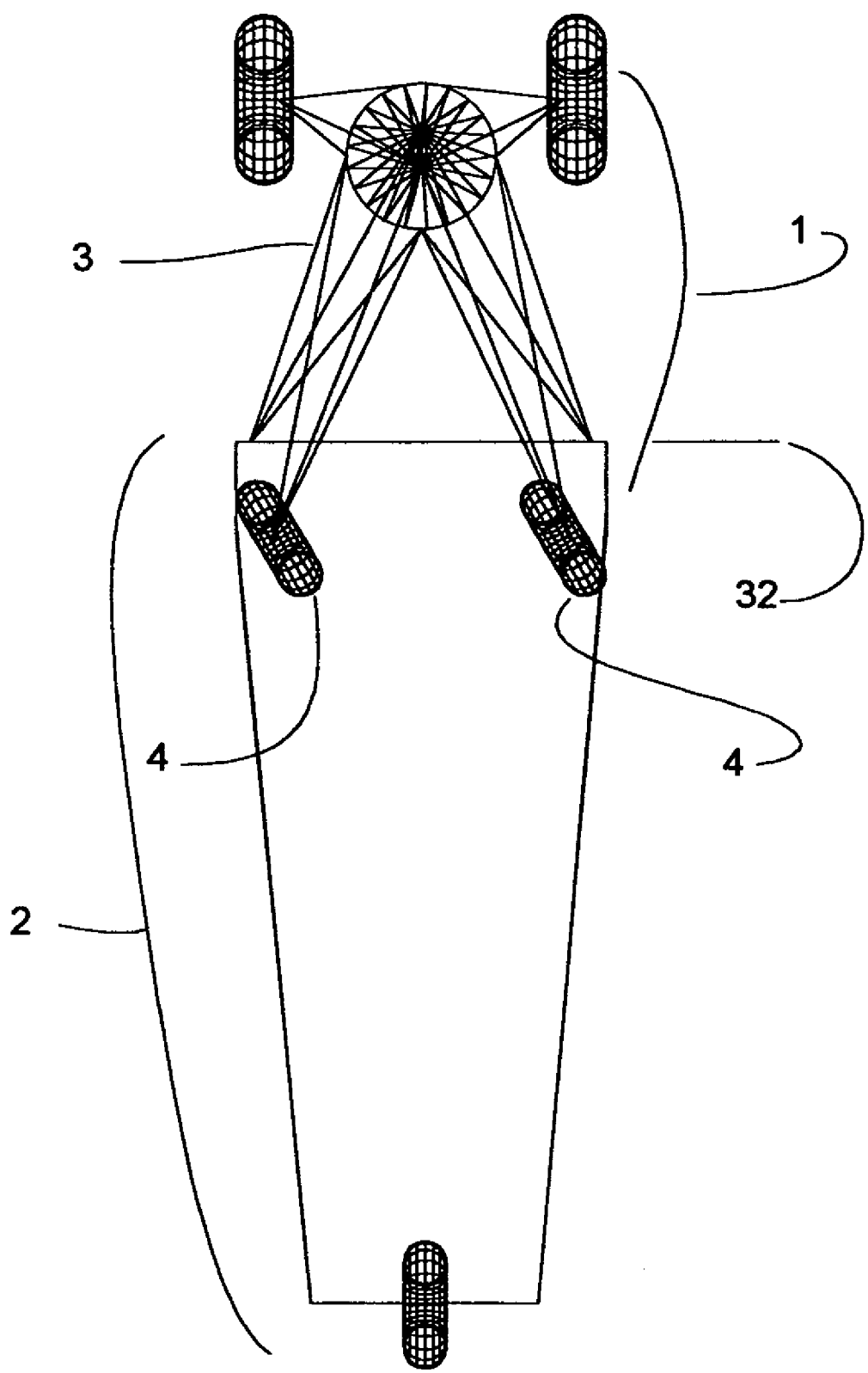
FIG. 5 shows the plan view where control wheels are pivoted to a turn initiating angle.

FIG. 5 is the same as FIG. 4 except the control wheels 4 are shown pivoted such that a turn is initiated. At this point the vehicle will be traveling straight ahead, but it will immediately begin to go into a turning configuration.

Figure 6:
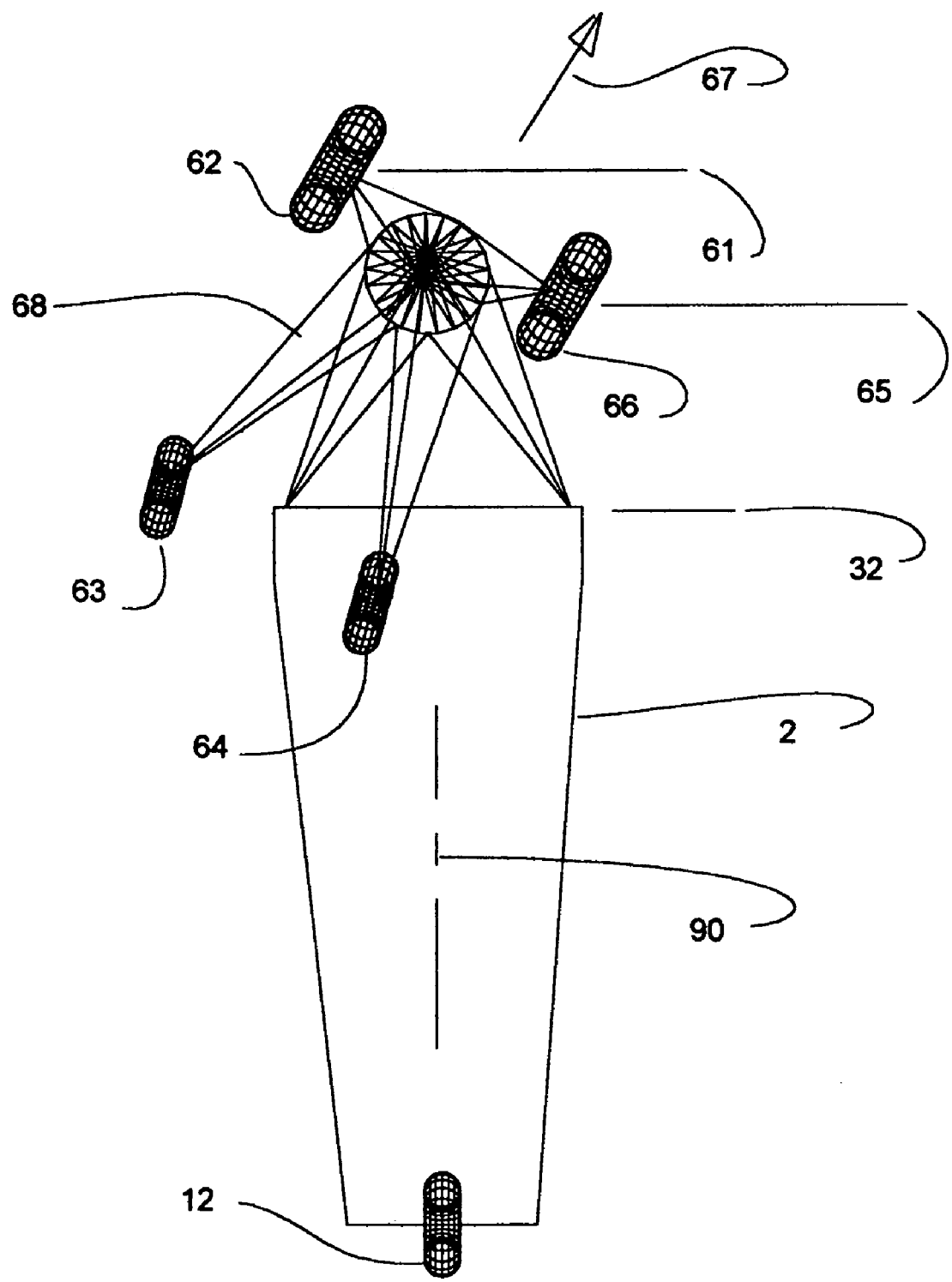
FIG. 6 is a plan view showing stabilizer and control wheels set for travel along a turning path.

The turning configuration transitions to the arrangement of FIG. 6. In this arrangement the vehicle will travel along a radius that, for a given speed, will determine radial acceleration of the vehicle. The product of this radial acceleration and the vehicle mass is the amount of force that must be provided laterally by the wheels. If this radial force were applied through the center of gravity of the vehicle, where this is on a line 90 through the center of the carriage 2 where mass of the joint structure and stabilizer are ignored, there would be no roll tendency, however, since it is applied at ground level, there is a roll causing torque, which is the product of the radial force and the height of the center of gravity above ground. For stable operation, the upward force on all wheels is adjusted as necessary to balance this roll torque. The simplest roll condition can be evaluated easily, where force on all wheels goes to zero, except for the upward force on the outrigger control wheel 63. This is the ultimate stabilizing force that must increase as necessary to counter the radial acceleration effect. The benefit of this stabilizing force is maximized by the length of the stabilizer support structure 68 that holds this wheel, the longer it is, the further out to the side it will be extended. Where the pitch axis is allowed free hinging, and the weight of the stabilizer and the joint structure are ignored, the maximum upward force on the outrigger control wheel 63 causes a pitching torque about the forward-most wheel. This pitching torque must be opposed by another pitching torque about that same wheel, caused by the downward force on the pitch axis 32. If not, the inside wheel 64 will lift off the ground and the upward force on the outrigger control wheel will no longer increase to provide the required stabilizing counter to the roll torque caused by the radial acceleration effect. Further, the pitch axis 32, cannot be rearward of the inside control wheel 64. The need to maximize downward force on the outrigger wheel governs weight distribution in the carriage 2 as shown in FIG. 1, as does the need to keep the rear wheel 12 in firm contact with the ground. It also governs the offset between the pitch axis 32 and the yaw axis 31 as shown in FIG. 2. Because the pitch axis cannot be rearward of the inside control wheel 64, increasing the offset distance, will not enable greater upward force on the outrigger control wheel 63, but it will provide a greater lateral lever arm to maximize roll stabilizing torque. This arrangement and its function result in a requirement for a very strong articulating joint structure and bearing system.

Another design limitations is apparent in reference to FIG. 6. The inside front wheel 66 must be arranged to prevent this vehicle from tipping over if it were to stop along this turning path. It appears that it would be judicious to add weight on the stabilizer near the front wheels such that traction will be sufficient to prevent skidding.

The bearing system shown is an example that can be improved on or replaced by a different form that suits the specific vehicle application of this invention. An approximate equivalent to the arrangement of FIG. 6 is a dual yaw axis system where front wheels separately pivot about their own respective yaw axis and each front wheel is linked to a respective control wheel. Linkages would cause the wheels to turn together as appropriate for the turning radius. A single pitch axis is retained. This works in approximately the same way as previously discussed, except the front wheels would not move laterally in a turning condition. There are advantages and disadvantages in this alternative.

Figure 7:
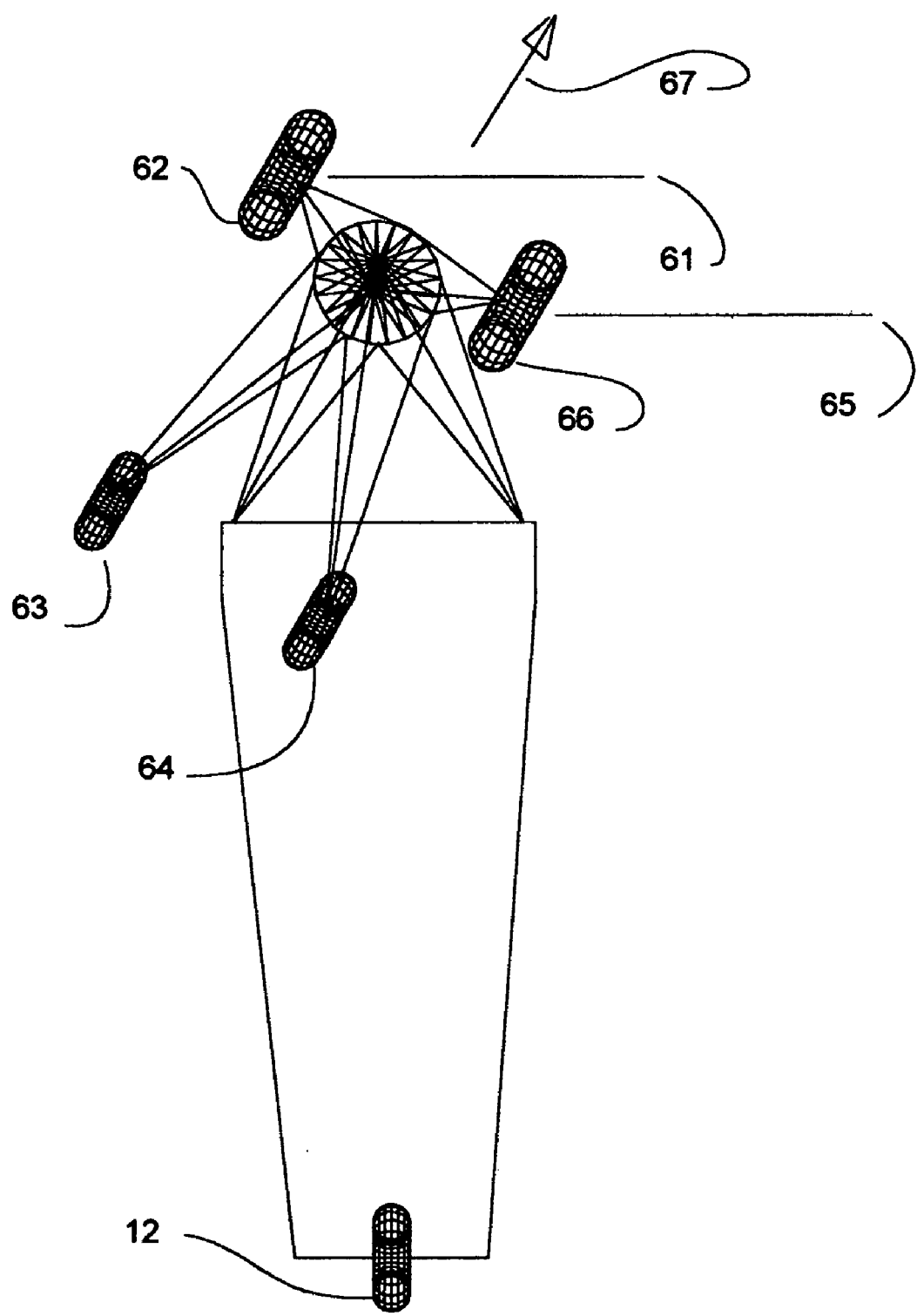
FIG. 7 is a plan view showing stabilizer on final, intended straight path, with carriage set to converge to that direction.

FIG. 7 depicts the same wire frame model where the turning process is ending. Here the stabilizer part has arrived on a straight course 67 that is aligned with the tiller 39 of FIG. 2(c). Because it is aligned with the tiller, the control wheels 63,64 have been automatically pivoted back to travel in the same direction as the front wheels 62,65. The vehicle will then converge to the straight course 67 as the rear wheel 12 follows into line.

Figure 8:
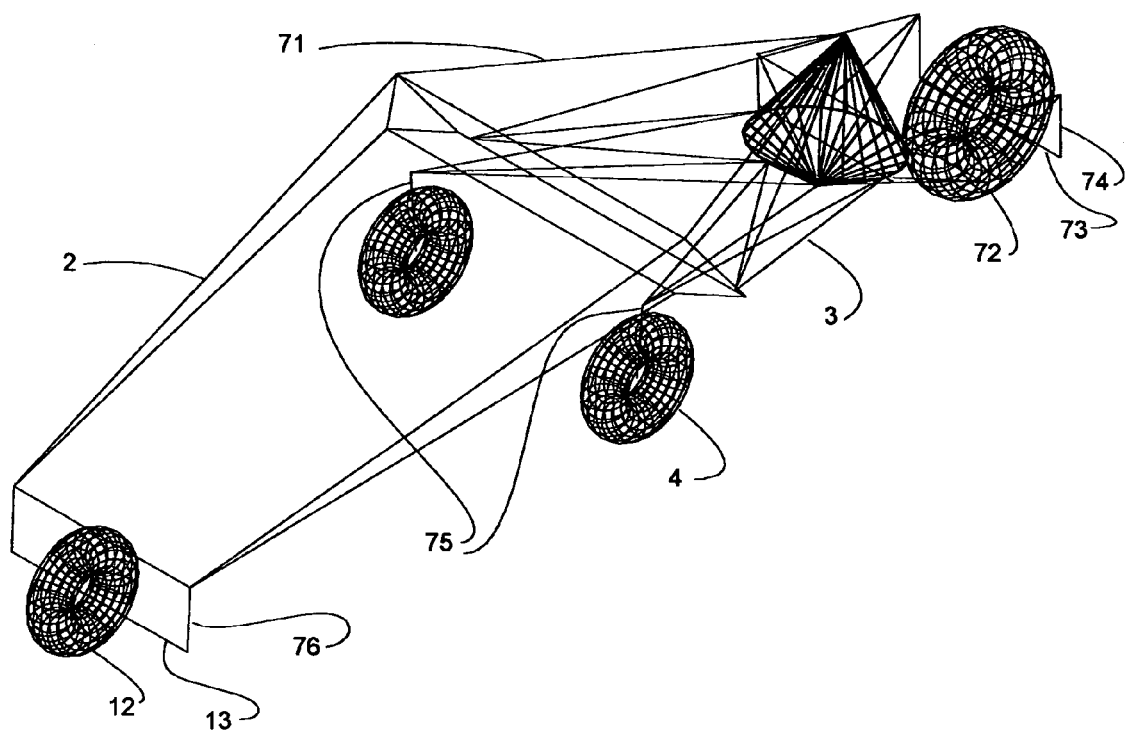
FIG. 8 shows a variation in the wheel arrangement with a variation where the pitch axis is constrained.
Figure 11:
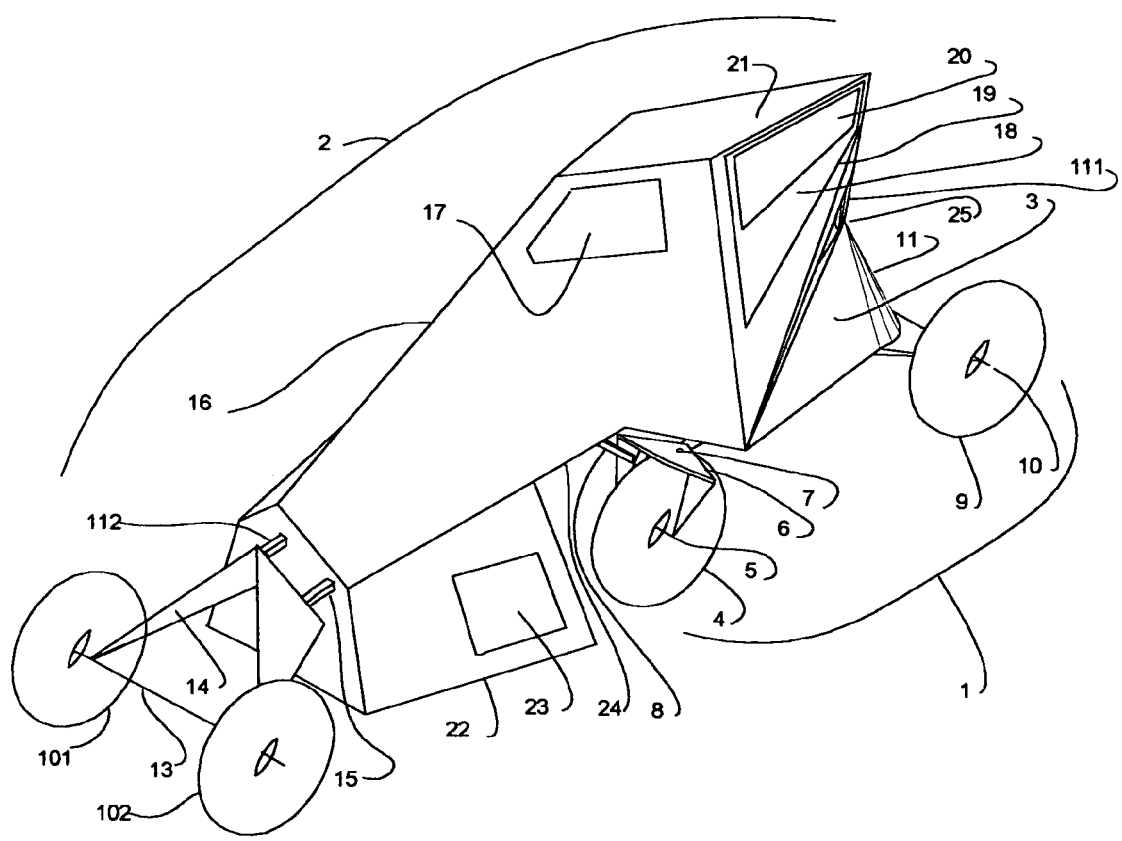
FIG. 11 shows the concept of FIG. 1 with the addition of refinements, representative of adaptation of general automotive industry capabilities.

If the pitch axis was locked, or even partially constrained as indicated 111 in FIG. 11, the effectiveness of the stabilizing outrigger wheel would be increased. This is a refinement that will ultimately be included in a design where suspension details at various points in the vehicle will be considered. A less obvious opportunity for incorporation of spring supported suspension is in the yaw axis joint, since there is not an absolute requirement for that joint to constraint a sliding motion along the axis. The ultimate suspension system will be a sophisticated balance between road handling requirements and passenger comfort that will vary for different driver styles. FIG. 8 shows a frame member 71 locking the pitch hinge completely. Now the springs 76 that attach the rear wheel axle 13 to the carriage 2 must accommodate a road surface that is not perfectly level. Control wheel springs 75 assist in compliance with the road as do springs 74 that attach the axle 73 of the single front wheel 72. This figure includes illustration of the single front wheel option.

Figure 9:
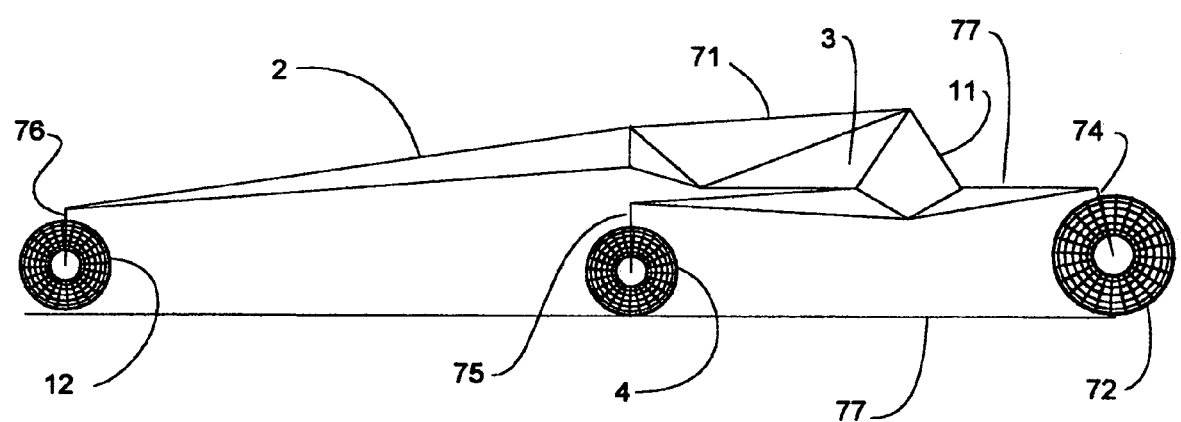
FIG. 9 further illustrates the constrained pitch axis configuration.

FIG. 9 is a side view of the same configuration that shows the road surface 77 with wheels in contact. The effect of the frame member 71 in preventing pitch hinging is visible here.

Figure 10:
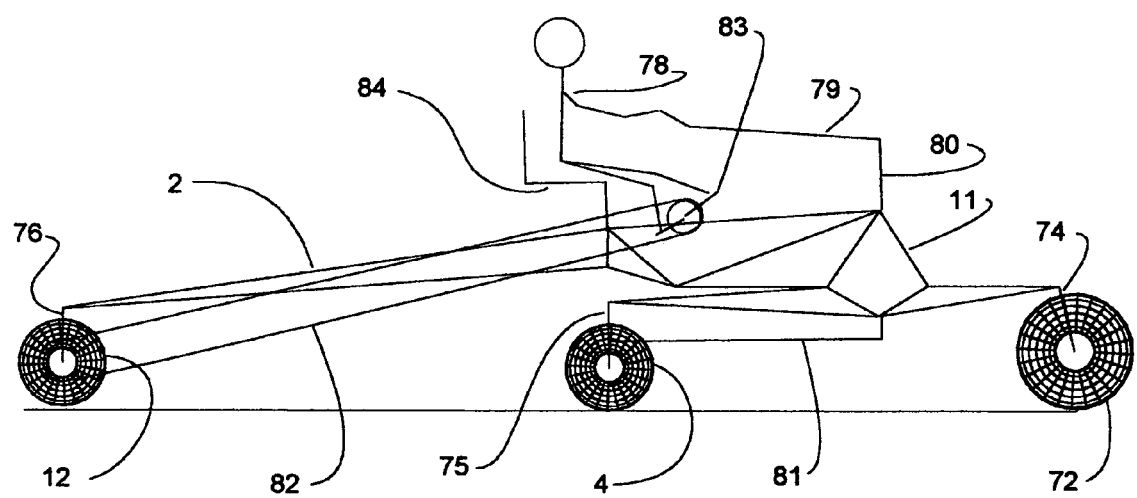
FIG. 10 illustrates the previous arrangement adapted for operations with manual drive power, comparable to operation of a bicycle.

FIG. 10 demonstrates the generality of the invention in regard to vehicle type. Here a configuration is shown that enables human powered operation by a rider 78. That rider sits on a seat 84, controls a tiller 79 that controls the control wheels 4 through a linkage 80, 81. The rider pushes pedals 83 that drive a drive chain 82 to cause vehicle drive force through the rear wheel 12. The yaw axis is shown vertical here to indicate options to adjust this to fit each application.

FIG. 11 shows variations on the vehicle shown in FIG. 1. These include a double rear wheel 101,102 arrangement. Also included is suspension control 112 that works in conjunction with pitch control 111, to maximize effectiveness of the roll stabilizing system.

Figure 12:
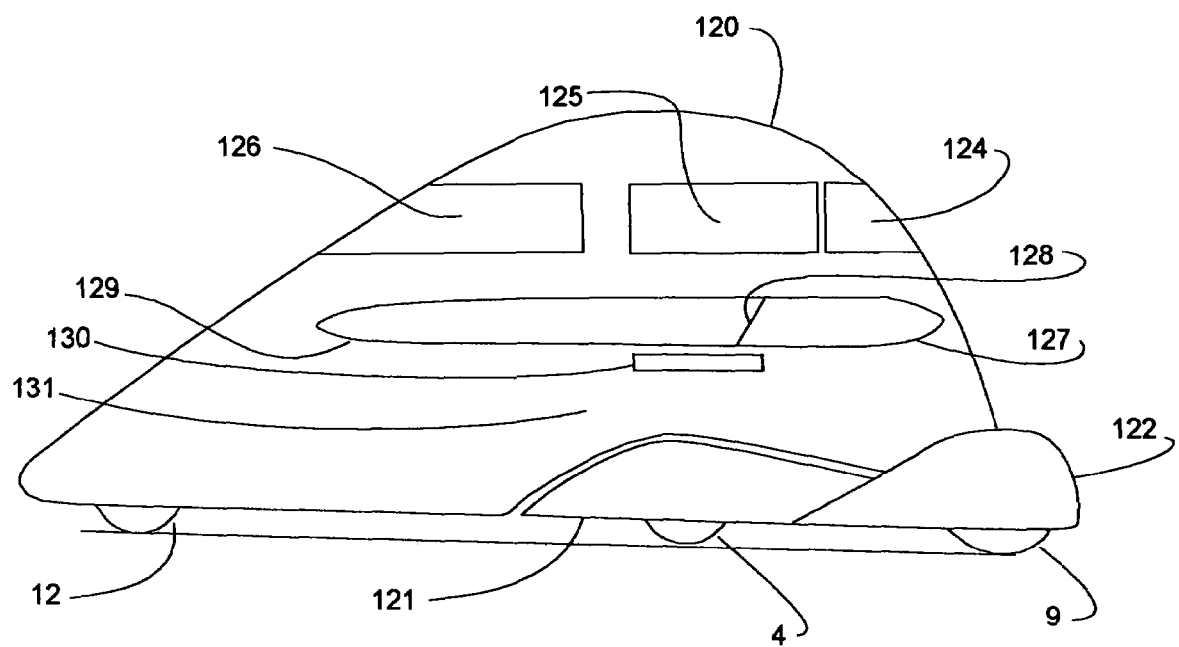
FIG. 12 is a conceptual streamlined version of the concept of FIG. 1.

A main purpose of the invention is to improve vehicle operating efficiency and the opportunity to significantly reduce vehicle drag while keeping the rider at a comfortable height is a key advantage of the high aspect ratio arrangement. However, it is necessary to follow through on this opportunity by optimizing air flow over the vehicle so that a low drag coefficient is achieved. FIG. 12 shows a streamlining concept that is compatible with the vehicle form of FIG. 1. The same front wheel 9, control wheel 4, and rear wheel 12, are shown. Now however, the stabilizer is fitted with a cover 121 and front wheel fairings 122 that reduce the coefficient of drag of the stabilizer. The carriage now has a new shape 120 that is modeled to conform with the nearly ideal cone sphere arrangement that is well known in fluid dynamics. Front 124, side 125, and rear 126 windows are now different. A small window 130 enables viewing of the control wheel position The lower side 131 of the carriage is indented to reduce frontal projected area at that level, where the pitch hinge arrangement 32 previously shown in FIG. 2(b) is narrowed to enable this. A fairing 127 controls air flow ahead of the mirror 128. A side guard 129 is integrated with the mirror fairing. The mirror fairing 127 and side guard 129 also define space that may be needed for extension of the stabilizing control wheel 4. This described shape can be implemented by attaching fairings to a frame or a unit body construction approach can utilize streamlined forms to implement the structural requirements as well as the streamlining requirements.

The high aspect ratio automobile version of this invention as depicted in FIG. 12 has road space, parking space, and fuel efficiency qualities in common with the well known motorcycle and safety and comfort qualities in common with a modem passenger car. Carcycle is a proposed name for this new combination.

This description of the preferred embodiments and variations has provided illustrations of the wheeled, articulated vehicle. As such it demonstrates a concept that is expected to have many variations that are a result of this invention. The appended clams should determine the scope of this invention, rather than the examples given.

I claim:

1. A wheeled vehicle for operation along a path on a generally horizontal surface, where said wheeled vehicle includes a stabilizer having at least three wheels, where at least one of said three wheels is a front stabilizer wheel and at least one of said three wheels is a rear stabilizer wheel, and a carriage having at least one wheel, where said stabilizer and said carriage are linked by a two axis joint, where said two axis joint includes an approximately vertical yaw axis that is fixed to said stabilizer, an approximately horizontal and transverse pitch axis that is fixed to said carriage, and a connecting structure that hinges at said yaw axis and at said pitch axis, thus to enable that said stabilizer turns relative to said carriage, yet serving to lock said stabilizer and said carriage together in regard to relative roll motion, where said two axis joint causes linkage that causes said carriage to follow travel of said stabilizer, like a trailer, where said rear stabilizer wheel is mounted to allow it to pivot about an approximately vertical axis that is fixed to said stabilizer at a point that is significantly rearward of said yaw axis, where control of a vehicle turning operation includes causing said pivot such that forward motion causes said rear stabilizer wheel to exerts force that causes said stabilizer to turn, with said carriage being guided from said yaw axis to follow a turning path, where rearward position of said rear stabilizer wheel causes said rear stabilizer wheel to significantly extend from said wheeled vehicle toward an outside of a turn so as to enable a counteracting force that acts to counteract a roll tendency caused by radial acceleration of a turning said wheeled vehicle, and where said connecting structure is configured such that said pitch axis is displaced from said yaw axis to enable a load distribution such that downward force at said pitch axis causes a torque that suppresses pitch tendencies of said stabilizer that occur in a turning condition, such that roll stabilization is effective.

2. A wheeled vehicle according to claim 1, where said stabilizer has two front wheels on fixed axles and two rear stabilizer wheels on pivoting axles, where each of said two rear stabilizer wheels pivots about a vertical axis to cause a turning operation.

3. A wheeled vehicle according to claim 1, where said approximately vertical yaw axis is angled forward, relative to said stabilizer, from true vertical to cause said carriage to tilt toward an inside of said, turning path, thus enhancing stability in a turn by imparting a favorable roll to the carriage.

4. A wheeled vehicle according to claim 1, where drive force is provided through a carriage wheel.

5. A wheeled vehicle according to claim 1, where drive force is provided through a front stabilizer wheel.

6. A wheeled vehicle according to claim 1, where drive force is provided through a said rear stabilizer wheel.

7. A wheeled vehicle according to claim 1, where said carriage has two wheels mounted at its rear.

8. A wheeled vehicle according to claim 1, where provision is made for drive power that is generated by a human being.

9. A wheeled vehicle according to claim 1, where drive power is generated by electric means.

10. A wheeled vehicle according to claim 1, where drive power is generated by an internal combustion engine.

11. A wheeled vehicle according to claim 1, where drive power is generated by electric means that utilizes battery storage.

12. A wheeled vehicle according to claim 1, where said approximately vertical yaw axis is tilted to cause said carriage to roll toward an inside of a turn, where roll angle is inversely related to turning radius.

13. A wheeled vehicle according to claim 1, with provision to turn at least one said carriage wheel about an approximately vertical axis.

14. A wheeled vehicle according to claim 1, with a suspension system that enhances passenger comfort where said suspension system includes spring supported suspension in said yaw axis joint.

15. A wheeled vehicle according to claim 1, where said vehicle includes streamlining surfaces to reduce air drag on a moving vehicle by optimizing air flow over said vehicle such that a low drag coefficient is achieved.

16. A wheeled vehicle for operation along a path on a generally horizontal surface, where said wheeled vehicle includes a stabilizer having at least two wheels, one of which is a front stabilizer wheel and one of which is a rear stabilizer wheel, and a carriage having at least one wheel, where stabilizer and said carriage are linked by a one axis joint,
where said one axis joint includes an approximately vertical yaw axis that is fixed to both said stabilizer and said carriage, where said one axis joint locks said stabilizer and said carriage together in regard to relative roll motion, and enables that said stabilizer turns relative to said carriage, and causes linkage that causes said carriage to follow stabilizer travel, like a trailer,
where said rear stabilizer wheel is mounted to allow it to pivot about an approximately vertical axis that is fixed to said stabilizer at a point that is significantly rearward of said yaw axis,
where control of a vehicle turning operation includes causing said pivot such that forward travel causes said rear stabilizer wheel to exerts force that causes said stabilizer to turn, where said carriage wheel follows resulting movement of said yaw axis such that with said carriage being guided from said yaw axis to follow a then turning path,
and where rearward position of said point causes said rear stabilizer wheel to
significantly extend from said wheeled vehicle toward an outside of said turning path so as to enable a counteracting force that acts to counteract a roll tendency of a turning said wheeled vehicle.

17. A wheeled vehicle according to claim 16, where a suspension system provides for wheels to adjust such that contact with said generally horizontal surface is maintained by at least two stabilizer wheels and at least one carriage wheel, to accommodate a road surface that is not level.

18. A wheeled vehicle for operation along a path on a generally horizontal surface,
where said wheeled vehicle includes a stabilizer having wheels that include a front stabilizer wheel and a rear stabilizer wheel, and a carriage where a driver rides in said carriage, said carriage having at least one carriage wheel, where said stabilizer and said carriage are linked by a two axis joint that is a link between said stabilizer and said carriage,
where said two axis joint includes an approximately vertical yaw axis, an approximately horizontal and transverse pitch axis, and a connecting structure that hinges at said yaw axis and at said pitch axis, where yaw and pitch axes are fixed to said stabilizer and to said carriage,
where said rear stabilizer wheel is mounted to allow it to pivot about an approximately vertical axis that is fixed to said stabilizer,
and where a vehicle turning operation includes a combination of pivoting of said rear stabilizer wheel about said vertical axis and hinging of said stabilizer about said yaw axis, with said carriage wheel being guided from said yaw axis to follow a then turning path, like a trailer,
where said stabilizer acts by position of a rear stabilizer wheel that is significantly rearward of said yaw axis such that said hinging of said stabilizer about said yaw axis results in significant extension of said rear stabilizer wheel to a position that is to the outside of a turn so as to counter roll tendencies of said carriage by causing roll suppressing torque that is applied to said carriage through said yaw axis and said pitch axis.

19. A wheeled vehicle according to claim 18, where said vehicle includes streamlining surfaces to optimize air flow over said vehicle such that a low drag coefficient is achieved.

20. A wheeled vehicle according to claim 18, where said approximately vertical yaw axis is angled forward, relative to said stabilizer, from true vertical to cause said carriage to tilt toward an inside of said turning path, thus enhancing stability in a turn by imparting a favorable roll to the carriage.

21. A wheeled vehicle according to claim 18, where said connecting structure provides a significant offset between said yaw axis and said pitch axis, where there is a downward force on said pitch axis caused by weight distribution, and where said downward force and said significant offset maximize downward force on that wheel that is significantly extended to maximize roll suppressing torque.

22. A wheeled vehicle according to claim 1 that operates such that radial acceleration force is a significant cause of roll tendencies of said wheel vehicle.

23. A wheeled vehicle according to claim 16 that operates such that radial acceleration force is a significant cause of roll tendencies of said wheeled vehicle.

24. A wheeled vehicle according to claim 18 that operates such that radial acceleration force is a significant cause of roll tendencies of said wheeled vehicle.

* * * * *